2 Sheets—Sheet 1.

J. P. LONG.
COMBINED SEEDER, CULTIVATOR, HARROW, AND CRUSHER.

No. 180,609. Patented Aug. 1, 1876.

WITNESSES
Chas. J. Gooch
A. H. Galt

INVENTOR
James P. Long
By Knight Bros. Attorneys

2 Sheets—Sheet 2.

J. P. LONG.
COMBINED SEEDER, CULTIVATOR, HARROW, AND CRUSHER.

No. 180,609. Patented Aug. 1, 1876.

WITNESSES
Chas. J. Gooch
A. H. Salt

INVENTOR
James P. Long
By Knight &co Attorneys

N. PETERS, PHOTO-LITHOGRAPHER, WASHINGTON, D. C.

UNITED STATES PATENT OFFICE.

JAMES P. LONG, OF OSAGE, IOWA.

IMPROVEMENT IN COMBINED SEEDERS, CULTIVATORS, HARROWS, AND CRUSHERS.

Specification forming part of Letters Patent No. 180,609, dated August 1, 1876; application filed July 17, 1876.

*To all whom it may concern:*

Be it known that I, JAMES P. LONG, of Osage, in the county of Mitchell and State of Iowa, have invented a new and Improved Combined Seeder, Cultivator, and Self-Adjusting Harrow and Crusher, of which the following is a specification:

To a broadcast seeder and cultivator, which may be similar in construction to those described in my Patents No. 46,480, dated the 21st of February, 1865, and No. 75,936, dated the 24th of March, 1868, I apply a range of cultivator-teeth, and back of these a harrow, drawn by links or chains, and a clod-crusher of peculiar construction, consisting of parallel bars, of any desired number, hinged together to adapt them to follow inequalities in the ground, as hereinafter described.

The harrow and crusher are detachable from the seeder and cultivators; and the crusher may be detached separately, permitting the seeder, cultivators, and harrow to be used without it when the moist condition of the ground or other causes may render this desirable.

Figure 1:
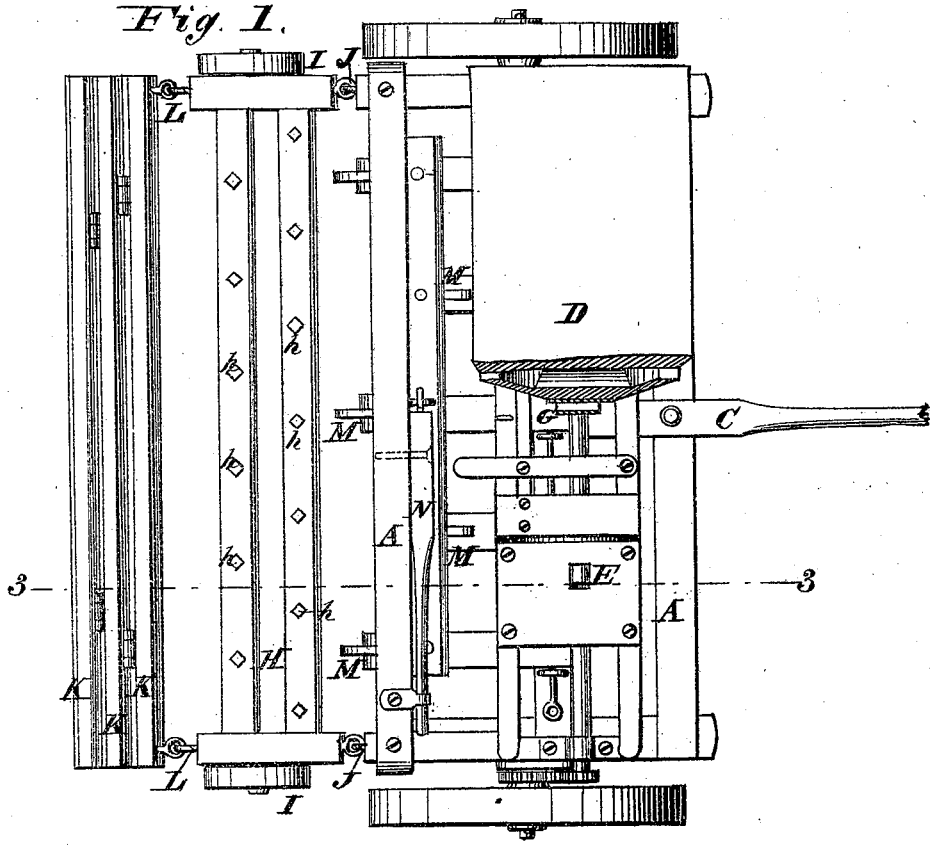
Figure 2:
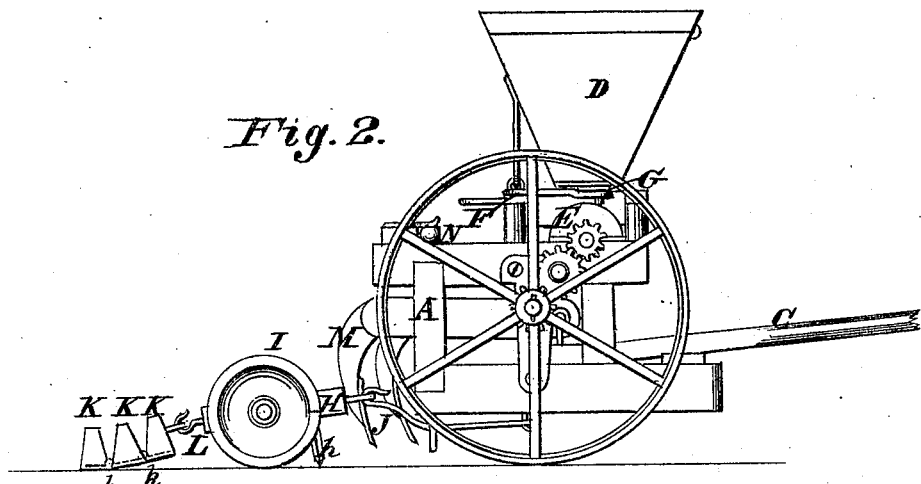
Figure 3:
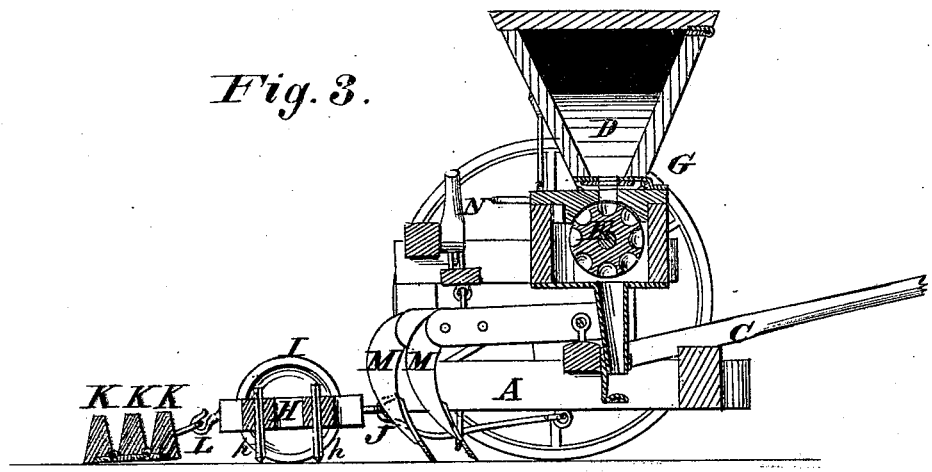
Figure 4:
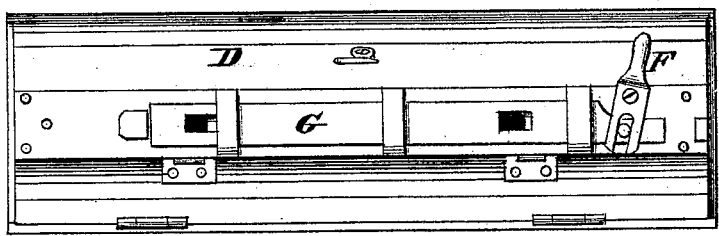

In the accompanying drawing, Figure 1 is a plan or top view of my combined seeder, cultivators, and self-adjusting harrow and crusher. Fig. 2 is a side view of the same. Fig. 3 is a vertical section on the line 3 3, Fig. 1. Fig. 4 is an under-side view of the seeder-hopper.

The seeding-machine may be similar in construction to that described in my previous Patents Nos. 46,480 and 75,936, or of any preferred or suitable construction.

A indicates the frame of the seeder; C, the draft-tongue; D, the hopper, and E the dropping-cylinder. F is a lever, and G a slide, operated thereby, to shut off the flow of seed when desired.

M M are the cultivators, and N the lever by which they are raised clear of the ground or lowered for operation, as required.

Figs. 1 and 2 show the position of the cultivators when the latter are raised, as required when moving the implement from place to place. Fig. 3 shows the cultivators lowered for use.

H represents my self-adjusting harrow, supported on wheels I, to regulate the penetration of its teeth $h$ and to lighten the draft. The harrow is connected to the cultivator-frame by hooks J, permitting it to be readily detached, when desired, and leaving it perfectly free to adjust itself to the ground.

My improved crusher and pulverizer consists of any desired number of bars, K, connected by hinge-joints $k$, so as to be free to follow undulations in the surface of the ground, and attached to the harrow-frame H by hooks L, permitting the said crusher to be separated, when desired, and causing it to rest on the ground independently of the harrow. The hinge-joints $k$ cause the crusher K K K to assume, on the under surface, either a flat or a convex or a concave form, as the shape of the ground it is passing over may demand.

In operation, the seed is dropped in the usual manner, and is covered effectually to the required depth by the cultivators M. The harrow H, following, levels the ground, and does much toward the pulverization thereof. The crusher K, following the harrow, presses the ground compactly on the seed, breaking up the remaining lumps, &c., and leaving the earth in the most favorable condition for the germination of the seed, and the healthy and continued growth of the plants.

The compact and smooth condition in which the ground is left by this implement greatly reduces the draft of the harvester.

Having thus described my invention, the following is what I claim as new therein, and desire to secure by Letters Patent:

1. The self-adjusting crusher, consisting of two or more parallel bars, K K, beveled upward, and hinged together at bottom, as and for the purposes set forth.

2. The combination of a seeder, a cultivator or harrow, and the herein-described self-adjusting crusher, substantially as and for the purposes herein set forth.

JAS. P. LONG.

Witnesses:
OCTAVIUS KNIGHT,
CHAS. J. GOOCH.